United States Patent [19]

Ueda et al.

[11] Patent Number: 5,055,247

[45] Date of Patent: Oct. 8, 1991

[54] PROCESS FOR PRODUCING WOODY MOLDINGS

[75] Inventors: Minoru Ueda; Hideaki Matsuda; Masanori Hara; Koichi Murakami, all of Kagawa, Japan

[73] Assignee: Okura Kogyo Kabushiki Kaisha, Japan

[21] Appl. No.: 21,984

[22] Filed: Mar. 5, 1987

Related U.S. Application Data

[63] Continuation of Ser. No. 551,043, Nov. 14, 1983, abandoned.

[30] Foreign Application Priority Data

Feb. 22, 1983 [JP] Japan ................................. 58-26981

[51] Int. Cl.$^5$ ...................... C08G 63/48; C08H 5/04; C08J 5/06
[52] U.S. Cl. ..................................... 264/109; 524/13; 524/14; 525/54.3; 527/103
[58] Field of Search ............... 264/109, 123, 126, 137, 264/331.12; 524/13, 14; 525/54.3; 527/103

[56] References Cited

U.S. PATENT DOCUMENTS 3,645,939 2/1972 Gaylord .
4,285,843 8/1981 Mayerhoffer .

*Primary Examiner*—Mary Lynn Theisen
*Attorney, Agent, or Firm*—Rosenman & Colin

[57] ABSTRACT

An industrially advantageous woody molding is produced by adding a dibasic acid anhydride to a woody material such as a wood meal in the presence or absence of a catalyst such as sodium carbonate, whereby the dibasic acid anhydride is bonded to the hydroxy group of the woody material to form an esterified woody material, adding thereto a compound having at least two epoxy groups in the molecule thereof, kneading well the mixture, and then heat and press molding the kneaded mixture at a temperature higher than 120° C. and a pressure greater than 60 kg/cm$^2$.

The product thus obtained by the process of this invention has a smooth and lustrous surface, has good water resistance and dimensional stability, and also is excellent in mechanical strength and hardness.

12 Claims, No Drawings

PROCESS FOR PRODUCING WOODY MOLDINGS

CROSS-REFERENCE

This is a continuation of Ser. No. 551,043 filed Nov. 14, 1983, now abandoned.

FIELD OF THE INVENTION

This invention relates to a novel process for producing woody moldings using chips, wood meal, or the digested products thereof

BACKGROUND OF THE INVENTION

Hitherto, fossil resources such as petroleum, coal, etc., have been used in large quantities but there is a limitation about the reserves thereof and hence the future of the reserves is a matter of anxiety. On the other hand, wood is a reproducible resource and has been utilized in various fields. However, the effective utilization of unused woods such as twigy woods, periodically thinned woods, etc., has not yet been practiced well and the development of more effective utilization processes of wood meal, chips, etc., by-produced as the industrial wastes in the industries utilizing woods has been desired.

As one of conventional processes for utilizing the aforesaid materials, there is a well-known technique wherein a wood meal is mixed with plastics such as a thermoplastic resin, a thermosetting resin, etc., for use as a filler or an extender. In this case thermoplastic resins are more generally used as the plastic. However, since in such a utilization process a wood meal is physically mixed with the foregoing resin, whereby the wood meal exists in the resin in the state of simple dispersion, as well as a wood meal is generally low in specific gravity and is bulky, it is very difficult to uniformly and finely disperse the wood meal in a resin Also, since wood is a material having a poor thermoplasticity and is not fused by heating the moldings obtained by mixing the wood meal with a thermoplastic resin show the appearance of the form of the wood meal itself and also show the reduction in smoothness and luster of the surface itself. Furthermore, the dimensional stability of the moldings is reduced by water absorption as well as the strength and hardness of the moldings are also reduced by water absorption.

The foregoing faults are caused in the case of using thermoplastic resins but thermosetting resins are also used for the foregoing purpose. Examples of the thermosetting resin are mainly a phenol resin, a melamine resin, a urea resin, etc. However, the use of such resins are also accompanied by the foregoing faults On the other hand, moldings obtained by using an epoxy resin have recently been used as materials for various industrial parts due to the excellent electric property, chemical resistance, toughness, and dimensional stability. An epoxy resin has many features or merits which are not obtained by a phenol resin and a melamine resin. However, in the production of epoxy resin moldings, wood meal, chips, etc., have little been used as fillers, extenders, etc. The reason is considered to be that wood has an affinity to a resin having a high hydrophilic property in the stage of the initial condensation product, such as a phenol resin and a melamine resin but an epoxy resin is lacking in such an affinity. However, it can be said to be a very significant matter to perform the investigation of the production of woody moldings having a high additional value by forming composite materials of wood using an epoxy resin having such various features.

Also, a chemical treatment for cellulose has been practiced for a considerably long time but a chemical treatment for wood has not yet been practically developed. The reason is considered to be that wood shows a very low chemical reactivity. For example, if a wood meal is mixed with an epoxy compound with stirring under heating for binding the hydroxy group of the wood to the epoxy group of the epoxy compound by the reaction of them, but in this case the ratio of binding of the epoxy compound to the wood is very low. The reason is that wood greatly differs from the foregoing cellulose in composition and structure. That is wood is mainly composed of highly crystalline cellulose having a crystallinity of about 60 to 70%, super macro-molecular lignin having a three-dimensional network structure, and noncrystal hemicellulose. These materials exist in the cell walls of the wood in such a state that the cellulose pass among the networks of the lignin assembly, which is in a steric sponge form, in the form of a fibrillar bundle and the hemicellulose is filled in these gaps. Therefore, it is considered that the chemical reaction occuring in cellulose is very reluctant to occur in wood.

The inventors tried to produce a woody molding mainly composed of wood components by simultaneously adding a polybasic acid anhydride and a compound having two or more epoxy groups in the molecule to wood meal and then heat and press molding the mixture. However, in this case there were difficulties that not all of the epoxy groups of the epoxy compound were used for a direct bonding reaction with the wood meal and a part of the polybasic acid anhydride added at performing the heat and press molding sublimed to cause a loss of the material as well as to cause an undesirable trouble in environmental sanitation.

SUMMARY OF THE INVENTION

The inventors have discovered that a dry woody material such as wood meal, chip, or the digested product thereof causes a ring-opening esterification between a dibasic acid anhydride and the hydroxy group of the woody material even under non-catalyst, whereby active carboxy groups are introduced as the side chain of the woody material molecule and based on the discovery, the present invention has been attained.

That is, the invention is a process for producing a woody molding which comprises adding a dibasic acid anhydride to a dry woody material selected from a wood meal, a chip, or the digested product thereof, whereby the dibasic acid anhydride is bonded to the hydroxy group of the woody material molecule to form a partially esterified woody material containing carboxyl groups, adding and as step two a compound having at least two epoxy groups in the molecule to the woody material partial ester obtained from step one, kneading the mixture, and then heating and press molding the resultant mixture at a temperature higher than 120° C. and a pressure greater than 60 kg/cm$^2$.

DESCRIPTION OF THE PREFERRED EMBODIMENT

The woody moldings obtained by the process of this invention are particularly excellent in water resistance, i.e., a dimensional stability to water as compared to conventional resin moldings obtained using a wood meal as the filler for the resin moldings. The woody moldings in this invention also have an improved mechanical strength as well as have further an increased heat distorption temperature.

The esterified woody material containing carboxyl groups used in this invention contains a woody material such as a wood meal, a chip, or the digested product thereof and is obtained by adding a dibasic acid anhydride to the woody material to cause a reaction between them, whereby the hydroxyl groups in the chemical components such as cellulose, hemicellulose, lignin, etc., contained in the wood texture are esterified to chemically introduce the carboxyl groups into the woody material. There is no particular restriction on the kind of material wood for the woody material used in this invention and, for example, a Japanese red pine, a cryptomeria, a Japanese cypress, a birch, lauan, etc., can be used but it is preferred that the water content in the woody material be less than 5%.

The dibasic acid anhydrides used in this invention are dicarboxylic acid anhydrides and practical examples are maleic anhydride, succinic anhydride, phthalic anhydride, tetrahydrophthalic anhydride, tetrabromophthalic anhydride, hexahydrophthalic anhydride, 3,6-dichlorophthalic anhydride, 4,5-dichlorophthalic anhydride, itaconic anhydride, etc. In particular, maleic anhydride, succinic anhydride, phthalic anhydride, etc., which are industrially advantageous and inexpensive, are preferred.

The esterification reaction of a woody material and the dibasic acid anhydride sufficiently proceeds even without a catalyst but for promoting the reaction, a catalyst such as the carbonates, oxides, hydroxides, carboxylates, etc., of an alkali metal or an alkaline earth metal; amine series compounds, e.g., dimethylbenzylamine, triethylamine, etc.; and pyridine, dimethylaniline, etc., may be used in this invention. In particular, when a catalyst such as sodium carbonate, etc., is used, an esterified woody material having a very high esterification degree can be produced as well as the use of such a catalyst has an effect of controlling the occurrence of the thermal decomposition of the esterified woody material formed in the reaction system during the reaction.

The foregoing esterification reaction may be performed in a solvent such as dimethylformamide, dimethyl sulfoxide, etc., but in this case the solvent must be removed after the reaction and hence it is simple and better to refrain from using a solvent.

It is preferred that the esterification reaction temperature be 60° C. to 180° C. When the esterification temperature is lower than 60° C., the esterification reaction is reluctant to occur. When the reaction is performed at a temperature of higher than 60° C. and lower than the melting point of the dibasic acid anhydride, the hydroxy groups of the woody material cause a chain-opening esterification reaction with the dibasic acid anhydride in spite of that the reaction system is heated and stirred in a solid phase state. When the esterification reaction temperature is higher than the melting point of the dibasic acid anhydride, the dibasic acid anhydride becomes a liquid and the esterification reaction proceeds in a state that the woody material is wetted with the dibasic acid anhydride, whereby the esterified product having a higher esterification degree is obtained The thermal decomposition or pyrolysis temperature of wood is about 210° C. but the thermal decomposition temperature of the esterified woody material is about 180° C., which is lower than the thermal decomposition temperature of wood. Accordingly, if the reaction is performed at a temperature higher than 180° C., the esterified woody material in the reaction system causes a thermal decomposition to reduce the weight of the material and hence the esterification reaction temperature is preferably in a range of 60° to 180° C.

The esterification reaction time is usually 10 minutes to 10 hours, preferably 30 minutes to 7 hours. The esterification degree is controlled by controlling the reaction temperature and the reaction time. The addition ratio of the dibasic acid anhydride to the esterified woody material is 5 to 120% by weight, preferably 5 to 70% by weight based on the weight of the woody material. Also, when the residual amount of the unreacted dibasic acid anhydride after the foregoing esterification reaction is small, the reaction product may be used as it is without being washed after the esterification reaction is over.

As the compound having at least 2 epoxy groups in the molecule thereof used in this invention, there are, for example, a bisphenol-type epoxy compound obtained from bisphenol A and epichlorohydrin, a novolak-type epoxy compound obtained from a phenol resin and epichlorohydrin, a halogenated epoxy compound obtained from a halogenated bisphenol A and epichlorohydrin, a polyalkylene ether-type epoxy compound obtained from a polyalkylene glycol and epichlorohydrin, a polybutadiene-type epoxy compound obtained by epoxylating the double bond portion of polybutadiene with peracetic acid, etc., an epoxy compound obtained from a diisocyanate and glycidol, and a copolymer of a vinyl compound and glycidyl acrylate or glycidyl methacrylate. In particular, the foregoing bisphenol-type epoxy compound which is industrially mass-produced and is available at a low cost is preferred.

The amount of the epoxy compound is usually 0.3 to 1.2 equivalent, preferably 0.6 to 1.0 equivalent of epoxy group per equivalent of the carboxy group in the esterified woody material.

Then, the process of this invention is explained. First of all, a preferred production process for a carboxy group-containing esterified woody material having a dibasic acid anhydride added to the hydroxy group of the woody material but the invention is not limited to the illustrated process. it is preferred to use a woody material after drying the woody material in a vacuum dryer or a hot blast dryer to reduce the water content of the woody material less than 5%. Then, a dibasic acid anhydride is added to the woody material and the mixture is stirred at a reaction temperature higher than 60° C. with or without the addition of a catalyst. In this case the reaction proceeds gradually during stirring under heating. If the reaction temperature is lower than 60° C., the addition ratio of the dibasic acid anhydride to the woody material is very low or no addition of the dibasic acid anhydride occurs and hence such a low reaction temperature is undesirable in this invention. Also, in the reaction system wherein a catalyst such as sodium carbonate, etc., is added to the reaction system at a reaction temperature of higher than 60° C., an esterified woody material having an addition ratio of the dibasic acid anhydride to the woody material of higher than 100% by weight based on the weight of the woody material is obtained.

The reaction time is usually 5 minutes to 10 hours, preferably 10 minutes to 4 hours. The esterification degree can be controlled by controlling the reaction temperature and the reaction time as described above and the reaction is performed until an esterified woody material having a desired esterification degree is obtained. After the reaction is over, the reaction product is washed with acetone and water and dried. It is clear from the analytical result of infrared absorption spectra that in the esterified woody material thus obtained by drying, the hydroxy group of the woody material has caused a ring-opening esterification reaction with the dibasic acid anhydride to add the dibasic acid anhydride to the woody material, whereby the carboxy group has been introduced in the side chain of the woody material molecule.

Furthermore, when the residual amount of the unreacted dibasic acid anhydride is small, the foregoing reaction product may be used as it is without being washed as the esterified woody material used in this invention as mentioned above. In this case since the greater part of the reaction product is composed of the esterified woody material, the problem in working environmental sanitation by the sublimation of the dibasic acid anhydride is exceedingly dissolved as compared to the case of forming a resin molding by directly adding a dibasic acid anhydride and an epoxy resin to a woody material, kneading the mixture, and heat and press molding the kneaded mixture Now, in the invention the esterified woody material prepared as above described is mixed with a compound having at least two epoxy groups in the molecule As the epoxy compound used in this case; the foregoing bisphenol-type epoxy compound is preferred. If the molecular weight of the epoxy compound is large, the crosslinking density of the resin phase after hardening is reduced and hence the epoxy compound having a mean molecular weight of about 200 to 2,000 is usually preferred. In particular, the liquid-type epoxy compound is more preferred. Also, as the case may be, a mono-epoxy compound such as phenyl glycidyl ether, styrene oxide, epichlorohydrin, etc., may be added to the reaction system as a diluent for reducing the viscosity of the mixture. Moreover, the epoxy compound may be dissolved in a proper solvent having no reactivity toward the epoxy compound, such as xylene, dibutyl phthalate, dioctyl phthalate, tricresyl phosphate, etc., and then added to the esterified woody material as the solution. However, in this case it is necessary to sufficiently remove the solvent after adding the epoxy compound solution.

The hardening reaction in the heat and press molding of this invention sufficiently proceeds without any catalyst but for promoting the hardening reaction, a catalyst conventionally used for hardening of epoxy resins by polycarboxylic acids or acid anhydrides, such as a metal salt of a carboxylic acid, a tertiary amine, etc., may be added to the mixture. For further increasing the mechanical strength of the woody molding thus obtained, glass fibers may be added to the mixture and also for imparting a burning resistance to the woody molding, a halogen-containing compound such as tetrabromobisphenol A, tetrachlorobisphenol A, hexachlorobenzene, etc., may be added to the mixture. Furthermore, dyes, pigments, etc., may be also added to the mixture as a coloring agent.

The mixture prepared as described above is further uniformly kneaded using a kneader such as a blender, kneader, mixing roll, etc. Since the esterified woody material used in this invention has active carboxy groups as described above and has a good affinity for an epoxy compound, the esterified woody material can be very effectively dispersed in an epoxy compound in the case of kneading the esterified woody compound with the epoxy compound. Accordingly, the mixing ratio of the esterified woody material and the epoxy compound can be desirably selected. In this case, also the saving of the amount of the epoxy compound by increasing the amount of the esterified woody material is possible. Then, the kneaded mixture thus obtained is placed in a mold and heated and pressed at a temperature higher than 120° C. and a pressure greater than 60 kg/cm$^2$ for a definite period of time. In the kneaded mixture the foregoing reaction proceeds with the increase of the heating temperature.

As described above, in the woody molding obtained by the process of this invention, the carboxy group of the esterified woody material is crosslinked with the epoxy group in the epoxy compound by causing an addition esterification reaction of them. In other words, the esterified woody material is crosslinked with the epoxy compound through the epoxy group of the epoxy compound in the woody molding, the surface of the woody molding is very hard and also the woody molding is very excellent in the dimensional stability to water and a mechanical strength.

Also, in the woody molding obtained by heat and press molding at a heating temperature higher than 120° C. and a pressure higher than 60 kg/cm$^2$ according to the process of this invention, the woody material used has been astonishingly plasticized and the surface thereof shows a smooth plastic-like appearance having luster when these conditions of temperature and pressure are not used, the woody material is not plasticized, the woody material is visible and the molding lacks luster. Moreover, the woody molding obtained by the process of this invention is mainly composed of a woody component, whereby the component can impart the characteristics of wood to the molding, and hence the woody molding in this invention is excellent in heat distortion temperature, electric insulating property, workability, etc., as compared to a conventional molding prepared by simply compounding a small amount of a wood meal, etc., with a molding resin.

Furthermore, by using a large amount of wood meal or chips by-produced in wood industries as industrial wastes, the woody moldings can be produced at a low cost in the process of this invention.

Therefore, the woody moldings obtained by the process of this invention are suitable for use as materials for industrial parts in many fields.

Then, the following examples are intended to illustrate the process of this invention but not to limit in any way.

Example 1

In a four-liter three-neck separable flask were placed 190.0 g of a dry wood meal of Japanese red pine having a water content of less than 5%, which passed through a 24-mesh sieve (hereinafter, is referred to as dry wood meal, 95.0 g of maleic anhydride, and 4.0 g of sodium carbonate as a catalyst and the mixture was stirred for one hour at 120° C. to perform a reaction. After the reaction was over, the reaction mixture was recovered, washed with acetone by means of a Soxhlet's extractor, and then washed with water. Thereafter, the reaction mixture was dried by means of a hot blast dryer to provide an esterified wood meal. The addition ratio of maleic anhydride added to the wood meal in the esterified wood meal was 18.0% by weight based on the weight of the wood meal.

To 154.7 g of the esterified wood meal thus prepared was added 35.3 g of EPOMIK R139, made by Mitsui Petrochemical Epoxy Co., Ltd., i.e., diglycidyl ether of bisphenol A (hereinafter, is simply referred to as diglycidyl ether of bisphenol A) and the resultant mixture was uniformly kneaded by means of a mixing roll. Thereafter, the kneaded mixture was dried for about one hour by means of a hot blast dryer of 80° C. and then was uniformly placed in a mold. Then, the mold was inserted between hot plates of a press machine to perform heat and press molding. That is, the heat and press molding was performed at a temperature of 150° C. and a pressure of 5 kg/cm$^2$ for 10 minutes directly after placing the mixture in the mold and then at a temperature of 190° C. and a pressure of 150 kg/cm$^2$ for 25 minutes. Thereafter, the molding was withdrawn from the mold to provide a board-like woody molding having a thickness of 6.4 mm.

Example 2

In a four-liter three-neck separable flask were placed 190.0 g of a dry wood meal, 95.0 g of succinic anhydride, and 4.0 g of sodium carbonate as a catalyst and the mixture was stirred for 25 minutes at 120° C. to perform a reaction. After the reaction was over, the reaction mixture was collected, washed with acetone by means of a Soxhlet's extractor, and then washed with water. Thereafter, the reaction mixture was dried by means of a hot blast dryer to provide an esterified woody meal. The addition ratio of succinic anhydride added to the wood meal of the esterified wood meal was 18.3% by weight based on the weight of the wood meal.

Then, after adding 34.6 g of diglycidyl ether of bisphenol A and 2.50 g of dimethylbenzylamine as a catalyst to 152.9 g of the esterified wood meal obtained as described above, the mixture was uniformly mixed by means of a mixing roll. Thereafter, the kneaded mixture was dried for about 2 hours by means of a hot blast dryer of 80° C. and then uniformly placed in a mold. Then, the mold was inserted in hot plates of a press machine to perform heat and press molding. That is, the heat and press molding was performed at a temperature of 150° C. and a pressure of 5 kg/cm$^2$ for 10 minutes directly after placing in the mold and then at a temperature of 190° C. and a pressure of 150 kg/cm$^2$ for 35 minutes. In this case the first heat and press molding was performed under deairing. After heat and press molding, the molding thus formed was withdrawn from the mold to provide a board-like woody molding having a thickness of 6.5 mm.

Example 3

In a four-liter three-neck separable flask were placed 190.0 g of a dry meal, 285.0 g of phthalic anhydride, and 4.02 g of sodium carbonate as a catalyst and the mixture was stirred for 1.5 hours at 140° C. to perform a reaction. After the reaction was over, the reaction mixture was collected, washed with acetone by means of a Soxhlet's extractor, and washed with water. Thereafter, the reaction mixture was dried by means of a hot blast dryer to provide an esterified wood meal. The addition ratio of phthalic anhydride added to the wood meal of the esterified wood meal was 21.8% by weight based on the weight of the wood meal.

To 152.0 g of the esterified wood meal thus obtained was added 38.0 g of diglycidyl ether of bisphenol A and the mixture was uniformly kneaded by means of a mixing roll. Thereafter, the kneaded mixture was dried for about one hour by means of a hot blast dryer of 80° C. and then uniformly placed in a mold. Then, the mold was inserted between the hot plates of a press machine to perform heat and press molding. That is, the heat and press molding was performed at a temperature of 150° C. and a pressure of 5 kg/cm$^2$ for 7 minutes directly after placing in the mold and then at a temperature of 190° C. and a pressure of 150 kg/cm$^2$ for 48 minutes. In addition, the first heat and press molding was performed under deairing. Thereafter, the molding was withdrawn from the mold to provide a board-like woody molding having a thickness of 6.6 mm.

Comparison example 1

After adding 57.0 g of diglycidyl ether of bisphenol A and 5.0 g of triethylenetetramine as a hardening agent therefor to 128.0 g of a dry wood meal, the mixture was uniformly kneaded by means of a mixing roll. Thereafter, the kneaded mixture was uniformly placed in a mold and then heat and press molding was performed by the same manner as in Example 1 to provide a board-like woody molding having a thickness of 6.6 mm.

Now, since in the woody moldings prepared in Examples 1 to 3 according to the process of this invention, the dibasic acid anhydride on the esterified wood meal has all been chemically bonded to the hydroxy group of the wood meal by causing an esterification reaction with the hydroxy group, there is no problem in working environmental sanitation by the sublimation of the dibasic acid anhydride during the production of the woody moldings. Also, the results of the microscopic observation of the surfaces of the board-like woody moldings obtained in Examples 1 to 3 according to the process of this invention showed that the form of woody meal was not observed and thus the wood meal had been plasticized. Therefore, the surfaces of the woody moldings obtained in Examples 1 to 3 showed a smooth and lustrous plastic-like appearance.

Then, sample pieces were cut off from the woody moldings obtained in Examples 1 to 3 and Comparison example 1 were subjected to property tests, the results of the tests being shown in Table 1. In addition, the wood meal mixing ratio is the weight percent of the wood meal in each kneaded mixture placed in the mold for molding. Also, the test procedures for the property tests were performed according to the following methods of ASTM.

Bending test: ASTM. D790-66
Compression test: ASTM. D695-69
Load flexible temperature test: ASTM. D648-56
Rockwell hardness test: ASTM. D785-65
Water absorption (Thickness expansion coefficient):

TABLE 1

|  | Ex. 1 | Ex. 2 | Ex. 3 | Comparison Ex. 1 |
|---|---|---|---|---|
| Wood meal mixing ratio (%) | 69.0 | 68.0 | 65.7 | 67.4 |
| Specific gravity | 1.39 | 1.38 | 1.37 | 1.37 |
| Bending strength (Kg/cm$^2$) | 761 | 726 | 688 | 650 |
| Compression strength (Kg/cm$^2$) | 1680 | 1550 | 1835 | 1367 |
| Heat distortion temperature (°C.) (18.6 kg/cm$^2$) | 107 | 101 | 95 | 95 |
| Rockwell hardness | 112 | 115 | 114 | 102 |

TABLE 1-continued

|  | Ex. 1 | Ex. 2 | Ex. 3 | Comparison Ex. 1 |
|---|---|---|---|---|
| (M scale) |  |  |  |  |
| Water absorption (%) | 1.64 | 1.16 | 0.35 | 2.27 |
| Thickness expansion coefficient (%) | 1.49 | 1.14 | 0.34 | 1.96 |

From the above results, it has been confirmed that the board-like woody moldings produced by the process of this invention in Example 1 to 3 are excellent in all properties as compared to the board-like woody molding in Comparison example 1 obtained by simultaneously adding the epoxy compound and triethylenetetramine as a hardening agent for the epoxy compound to a wood meal.

Example 4

In a four-liter three-neck flask were placed 190.0 g of a dry wood meal, 95.0 g of succinic anhydride, and 4.0 g of sodium carbonate as a catalyst and the mixture was reacted under stirring for 7.5 minutes at 120° C. After the reaction was over, the reaction mixture was collected, washed with acetone by means of a Soxhlet's extractor, and then washed with water. Thereafter, the reaction mixture was dried by means of a hot blast dryer to provide an esterified wood meal. The addition ratio of succinic anhydride added to the wood meal in the esterified wood meal was 2.84% by weight based on the weight of the wood meal.

To 180.7 g of the esterified wood meal thus obtained as described above was added 9.3 g of diglycidyl ether of bisphenol A and the mixture was uniformly kneaded by means of a mixing roll. Thereafter, the kneaded mixture was placed in a mold and then heat and press molded as in Example 2 to provide a board-like woody molding having a thickness of 7.2 mm.

Comparison example 2

According to an ordinary process for producing a dry fiber board, a Japanese red pine chip was placed in a digester, digested under the conditions of a vapor pressure of 8 kg/cm$^2$ and a digesting time of 4 minutes, and the digested product was subjected to opening by means of a refiner to provide fibers in wet state. The fibers were dried by means of a hot blast dryer of 90° C. to a water content of less than 5%. Then, a phenol resin adhesive having a solid content of 45% was sprayed onto the fibers by means of an air spray gun at 8.2% resin per total dry weight of the fibers.

Then, a fiber mat was formed by means of a forming machine using the fibers thus sprays and the fiber mat was pre-pressed at a pressure of 10 kg/cm$^2$. Then, the fiber mat was inserted between the hot plates of a hot press and heat and press molded for 4 minutes at a temperature of 190° C. and a pressure of 60 kg/cm$^2$ to provide a woody fiber board having a thickness of 4.3 mm.

Now, the surface of the board-like woody molding obtained according to the process of this invention showed a smooth and lustrous plastic-like appearance. Test pieces were cut off from the board-like woody molding obtained in Example 4 and the woody fiber board obtained in Comparison example 2 were subjected to the property tests as described above and the results are shown in Table 2.

TABLE 2

|  | Example 4 | Comparison example 2 |
|---|---|---|
| Woody material mixing ratio (%) | 92.4 | 92.4 |
| Specific gravity | 1.33 | 1.05 |
| Bending strength (kg/cm$^2$) | 606 | 438 |
| Compression strength (kg/cm$^2$) | 1296 | — |
| Heat distortion temperature (°C.) (18.6 kg/cm$^2$) | 165 | 91 |
| Rockwell hardness (M scale) | 102 | 69 |
| Water absorption (%) | 9.25 | 35.4 |
| Thickness expansion coefficient (%) | 6.14 | 10.3 |

From the above results, it has been confirmed that the board-like woody molding produced by the process of this invention in Example 4 is very excellent in all the properties as compared to the woody fiber board in Comparison example 2 obtained by digesting the wood chip, opening the digested chip, spraying a phenol resin adhesive onto the fibers thus obtained, and heat and press molding the sprayed fibers.

Example 5

In a four-liter three-neck separable flask were placed 230.0 g of a dry wood meal and 69.0 g of maleic anhydride and the mixture was reacted under stirring for 30 minutes at 115° C. After the reaction was over, the reaction mixture was collected and washed with acetone by means of a Soxhlet's extractor. Thereafter, the reaction mixture was dried by means of a hot blast dryer to provide an esterified woody meal. The addition ratio of maleic anhydride added to the wood powder of the esterified wood meal was 8.55% by weight based on the wood meal.

To 165.0 g of the esterified wood meal obtained as described above was added 25.0 g of Epiol G-100, made by Nippon Oil and Fats Co., Ltd., i.e., glycerol diglycidyl ether (hereinafter, is referred to glycerol diglycidyl ether) and the mixture was uniformly kneaded by means of a mixing roll. Thereafter, the kneaded mixture was uniformly placed in a mold and then heat and press molded as in Example 1 to provide a board-like woody molding having a thickness of 7.0 mm.

Comparison example 3

After adding 25.0 g of glycerol diglycidyl ether and 13.0 g of succinic acid as a hardening agent for the ether to 152.0 g of a dry wood meal, the mixture was uniformly kneaded by means of a mixing roll. Thereafter, the kneaded mixture was uniformly placed in a mold and then heat and press molded as in Example 2 to provide a board-like woody molding having a thickness of 7.0 mm.

Sample pieces were cut off from the woody moldings obtained in Example 5 and Comparison example 3 and subjected to the property tests as described above, the results obtained being shown in Table 3.

TABLE 3

|  | Example 5 | Comparison example 3 |
|---|---|---|
| Wood meal mixing ratio (%) | 80.0 | 80.0 |
| Specific gravity | 1.35 | 1.35 |
| Bending strength (Kg/cm$^2$) | 621 | 382 |
| Compression strength (Kg/cm$^2$) | 1332 | 893 |
| Heat distortion temp. (°C.) | 111 | 110 |

TABLE 3-continued

|  | Example 5 | Comparison example 3 |
|---|---|---|
| (18.6 kg/cm$^2$) | | |
| Rockwell hardness (M scale) | 110 | 83 |
| Water absorption (%) | 6.45 | 9.47 |
| Thickness expansion coefficient (%) | 5.82 | 8.20 |

From the above results, it has been confirmed that the board-like woody molding obtained according to the process of this invention in Example 5 is greatly excellent in bending strength, compression strength, and hardness and also is excellent in water absorption and thickness expansion coefficient as compared to the board-like woody molding in Comparison example 3 obtained by simultaneously adding the epoxy compound and succinic acid as the hardening agent of the epoxy compound to the wood meal and heat and press molding the mixture.

Example 6

In a four-liter three-neck separable flask were placed 260.0 g of a dry wood meal, 65.0 g of maleic anhydride, and 2.0 g of sodium carbonate as a catalyst and the mixture was reacted under stirring for 6 hours at 140° C. In the reaction system the feed ratio of maleic anhydride to the wood meal was 25.0% by weight. After the reaction was over, the reaction mixture was collected to provide an esterified wood meal without washing. The addition ratio of maleic anhydride added to the wood meal in the esterified wood meal was 14.0% by weight based on the weight of the wood meal.

To 145.7 g of the esterified wood meal thus obtained as described above was added 44.3 g of diglycidyl ether of bisphenol A and the mixture was uniformly kneaded by means of a mixing roll. Thereafter, the kneaded mixture was dried for one hour by means of a hot blast dryer of 80° C. and then uniformly placed in a mold. Then, the kneaded mixture was heat and press molded as in Example 1 to provide a board-like woody molding having a thickness of 6.7 mm.

Example 7

In a four-liter three-neck separable flask were placed 260.0 g of a dry wood meal, 65.0 g of succinic anhydride, and 2.0 g of sodium carbonate as a catalyst and the mixture was reacted under stirring for 6 hours at 140° C. In the reaction system the feed ratio of succinic anhydride to the wood meal was 25.0% by weight. After the reaction was over, the reaction mixture was collected to provide an esterified wood meal without washing. The addition ratio of succinic anhydride added to the wood meal in the esterified wood meal was 20.6% by weight based on the weight of the wood meal.

To 145.7 g of the esterified wood meal thus obtained as described above was added 44.3 g of diglycidyl ether of bisphenol A and the mixture was uniformly kneaded by means of a mixing roll. Thereafter, the kneaded mixture was dried for about 2 hours by means of a hot blast dryer of 80° C., uniformly placed in a mold, and then heat and press molded as in Example 2 to provide a board-like woody molding having a thickness of 6.7 mm.

Comparison example 4

After adding 50.3 g of diglycidyl ether of bisphenol A and 23.2 g of succinic acid as a hardening agent therefor to 116.5 g of a dry wood meal, the mixture was uniformly kneaded by means of a mixing roll. Thereafter, the kneaded mixture was uniformly placed in a mold and heat and press molded as in Example 2 provide a board-like woody molding having a thickness of 6.6 mm.

Comparison example 5

After adding 36.5 g of diglycidyl ether of bisphenol A and 36.5 g of a polyamide resin (liquid state, amine value: 400) as a hardening agent therefor to 117.0 g of a dry wood meal, the mixture was uniformly kneaded by means of a mixing roll. Thereafter, the kneaded mixture was uniformly placed in a mold and then heat and press molded as in Example 1 to provide a board-like woody molding having a thickness of 6.8 mm.

Now, in the woody moldings produced according to the process of this invention in Examples 6 and 7, the greater part of the dibasic acid anhydride in the esterified wood meal has been bonded to the hydroxy group of the wood by causing an esterification reaction with the hydroxy group, the trouble in working environmental santation by the sublimation of the dibasic acid anhydride has been greatly dissolved. Also, the results of the microscopic observation of the surfaces of the board-like woody moldings produced by the process of this invention in Examples 6 and 7 showed that no form of wood meal was observed and thus the wood meal has been plasticized. Therefore, the surfaces of the woody moldings showed a smooth and lustrous plastic appearance.

Sample pieces cut off from the woody moldings obtained in Examples 6 and 7 and Comparison examples 4 and 5 were subjected to the property tests as described above, the results of the property tests being shown in Table 4.

TABLE 4

|  | Ex. 6 | Ex. 7 | Comparison Ex. 4 | Comparison Ex. 5 |
|---|---|---|---|---|
| Wood meal mixing ratio (%) | 61.3 | 61.3 | 61.3 | 61.6 |
| Specific gravity | 1.35 | 1.35 | 1.37 | 1.33 |
| Bending strength (Kg/cm$^2$) | 804 | 698 | 459 | 764 |
| Compression strength (Kg/cm$^2$) | 1538 | 1472 | 1098 | 937 |
| Heat distortion temperature (°C.) (18.6 Kg/cm$^2$) | 77 | 87 | 76 | 62 |
| Rockwell hardness (M scale) | 112 | 105 | 101 | 99 |
| Water absorption (%) | 0.68 | 1.06 | 3.04 | 2.48 |
| Thickness expansion coefficient (%) | 0.74 | 0.91 | 2.94 | 1.96 |

From the above results, it has been confirmed that the board-like woody moldings produced by the process of this invention in Examples 6 and 7 are greatly excellent in water absorption, thickness expansion coefficient, hardness, and compression strength as compared to the board-like woody moldings obtained by simultaneously adding the epoxy compound and succinic acid or a polyamide resin as a hardening agent therefor to a wood meal followed by heat and press molding. Also, it has been confirmed that the woody moldings in this invention are excellent in heat distortion temperature.

Example 8

In a four-liter three-neck separable flask were placed 224.0 g of a dry wood meal, 15.5 g of maleic anhydride, and 0.32 g of sodium carbonate as a catalyst and the mixture was reacted under stirring for 6 hours at 140° C. In the reaction system the feed ratio of maleic anhydride to the wood meal was 6.0% by weight. After the reaction was over, the reaction mixture was collected to provide an esterified wood meal without washing. The addition ratio of maleic anhydride added to the wood meal in the esterified wood meal was 4.9% by weight.

To 168.7 g of the esterified wood meal obtained as described above was added 21.3 g of diglycidyl ether of bisphenol A and the mixture was uniformly kneaded by means of a mixing roll. Thereafter, the kneaded mixture was dried for about one hour by means of a hot blast dryer of 80° C. and then uniformly placed in a mold. The kneaded mixture thus placed in the mold was then heat and press molded as in Example 1 to provide a board-like woody molding having a thickness of 6.9 mm.

Comparison example 6

After adding 29.4 g of diglycidyl ether of bisphenol A and 2.9 g of triethylenetetramine as a hardening agent therefor to 157.7 g of a dry wood meal, the mixture was uniformly kneaded by means of a mixing roll. Thereafter, the kneaded mixture was uniformly placed in a mold and then heat and press molded as in Example 1 to provide a board-like woody molding having a thickness of 7.0 mm.

The results of the microscopic observation of the surface of the board-like woody molding produced by the process of this invention in Example 8 showed that no form of wood meal was observed and thus the wood meal has been plasticized. Therefore, the surface of the woody molding obtained in Example 8 showed a smooth and lustrous plastic-like appearance. Sample pieces were cut off from the woody moldings obtained in Example 8 and Comparison example 6 were subjected to the property tests as described above and the results of the property tests are shown in Table 5.

TABLE 5

|  | Example 8 | Comparison Example 6 |
|---|---|---|
| Wood meal mixing ratio (%) | 83.1 | 83.0 |
| Specific gravity | 1.38 | 1.36 |
| Bending strength (Kg/cm$^2$) | 730 | 688 |
| Compression strength (Kg/cm$^2$) | 1705 | 1349 |
| Heat distortion temperature (°C.) (18.6 Kg/cm$^2$) | 163 | 139 |
| Rockwell hardness (M scale) | 116 | 105 |
| Water absorption | 1.99 | 2.88 |
| Thickness expansion coefficient (%) | 2.42 | 3.18 |

From the above results, it has been confirmed that the board-like woody molding obtained by the process of this invention in Example 8 was greatly excellent in heat distortion temperature and hardness as well as was also excellent in water absorption, thickness expansion coefficient, compression strength, and bending strength as compared to the board-like woody molding obtained in Comparison example 6 by simultaneously adding the epoxy compound and triethylenetetramine as a hardening agent for the epoxy compound to a wood meal and heat and press molding the mixture.

Example 9

In a two-liter three-neck separable flask were placed 130.0 g of a dry chip of red lauan usually used as a raw material for particle boards, 35.1 g of phthalic anhydride, and 0.69 g of sodium carbonate as a catalyst and the mixture was reacted under stirring for 6 hours at 160° C. In the reaction system the feed ratio of phthalic anhydride to the chip was 27.0% by weight. After the reaction was over, the reaction mixture was collected to provide an esterified chip without washing. The addition ratio of phthalic anhydride added to the chip in the esterified chip was 16.6% by weight based on the weight of the chip.

Then, to 71.7 g of the esterified chip thus obtained as described above was added 23.3 g of diglycidyl ether of bisphenol A and the mixture was uniformly kneaded by means of a kneader. Thereafter, the kneaded mixture was dried for about one hour by means of a hot blast dryer of 90° C. and uniformly placed in a mold. Then, the mold was inserted between the hot plates of a press machine to perform heat and press molding of the mixture. That is, the heat and press molding was performed at a temperature of 150° C. and a pressure of 5 kg/cm$^2$ for 10 minutes directly after placing the mixture in the mold and further at a temperature of 180° C. and a pressure of 150 kg/cm$^2$ for 50 minutes. In addition, the first heat and press molding was performed under deairing. Thereafter, the molding was withdrawn from the mold to provide a board-like woody molding having a thickness of 3.3 mm.

Example 10

According to a conventional process of producing a dry fiber board, a chip of a mixture of a cryptomeria and a Japanese cypress was supplied in a digester and after digesting the chip for 4 minutes at a vapor pressure of 8 kg/cm$^2$, the digested chip was subjected to opening by means of a refiner to provide fibers in a wet state. The fibers were then dried by means of a hot blast dryer of 90° C. to a water content of less than 5%. Then, 130.0 g of the dry fibers of the mixture of a cryptomeria and Japanese cypress passed through a 13 mesh sieve, 32.5 g of maleic anhydride, and 1.01 g of sodium carbonate as a catalyst were placed in a two-liter three-neck separable flask and the mixture was reacted under stirring for 6 hours at 160° C. In the reaction system the feed ratio of maleic anhydride to the fibers was 25.0% by weight. After the reaction was over, the reaction mixture was collected to provide esterified fibers without washing. The addition ratio of maleic anhydride added to the fibers in the esterified fibers was 15.7% by weight based on the weight of the fibers.

Then, to 68.6 g of the esterified fibers thus obtained as described above was added 26.4 g of glycidyl ether of bisphenol A and the mixture was uniformly kneaded by means of a mixing roll. Thereafter, the kneaded mixture was dried for about one hour by means of a hot blast dryer of 80° C. and then uniformly placed in a mold. Then, the mixture was heat and press molded as in Example 1 to provide a board-like woody molding having a thickness of 3.2 mm.

Example 11

In a three-liter glass beaker were placed 100.0 g of a dry chip of red lauan usually used as a raw material for particle boards, 300 g of maleic anhydride, 600 g of dimethylformamide, and 9.00 g of dimethylbenzylamine as a catalyst and the mixture was reacted in the immersed state for 15 hours at 23° C. After the reaction was over, the reaction mixture was collected and washed with acetone by means of a Soxhlet's extractor. Thereafter, the reaction mixture was dried by means of a hot blast dryer to provide an esterified chip. The addition ratio of maleic anhydride added to the chip of the esterified chip was 22.1% by weight based on the chip.

Then, to 70.5 g of the esterified chip thus obtained as described above was added 24.5 g of diglycidyl ether of bisphenol A and the mixture was uniformly kneaded by means of a kneader. Thereafter, the mixture was dried for about one minute by means of a hot blast dryer of 90° C. and then uniformly placed in a mold. Then, the mixture was heat and press molded as in Example 1 to provide a board-like woody molding having a thickness of 3.3 mm.

Example 12

According to a conventional process of producing dry fiber boards, a radiata pine chip was placed in a digester and after digesting the chip for 4 minutes at a vapor pressure of 8 kg/cm$^2$, the digested chip was subjected to opening by means of a refiner to provide fibers in wet state. The fibers were dried by means of a hot blast dryer of 90° C. to a water content of less than 5%. Then, 100.0 g of the radiata pine fibers passing through a 13 mesh sieve, 300 g of maleic anhydride, 600 g of dimethyl sulfoxide, and 9.00 g of pyridine as a catalyst were placed in a three-liter glass beaker and the mixture was reacted in the immersed state for 15 hours at 23° C. After the reaction was over, the reaction mixture was collected and washed with acetone by means of a Soxhlet's extractor. Thereafter, the product was dried by means of a hot blast dryer to provide esterified fibers. The addition ratio of maleic anhydride added to the fibers of the esterified fibers was 28.3% by weight based on the weight of the fibers.

Then, to 74.5 g of the esterified fibers thus obtained as described above were added 20.5 g of glycerol diglycidyl ether, and 0.41 g of dimethylbenzylamine as a catalyst and the mixture was uniformly kneaded by means of a mixing roll. Thereafter, the kneaded mixture was dried for about one hour by means of a hot blast dryer of 90° C., uniformly placed in a mold, and then heat and press molded as in Example 1 to provide a board-like woody molding having a thickness of 3.2 mm.

The surfaces of the board-like woody moldings produced by the process of this invention in Examples 9 to 12 was tough, hard, and smooth.

What is claimed is:

1. A two-step process for producing a hard woody molding, which comprises as step one, adding a dibasic acid anhydride to hydroxy groups of a woody material selected from the group consisting of wood chip, wood metal and the digested product thereof to form a half ester of the woody material, said half ester containing carboxyl groups, and, as step two, adding a compound having at least two epoxy groups in the molecule thereof to the half ester of the woody material obtained from step one, and after sufficiently kneading the mixture, heating and press molding the kneaded mixture at a temperature higher than 120° C. and a pressure greater than 60 kg/cm$^2$, whereby said woody molding is cross-linked by reaction between the epoxy groups of said epoxy compound and the carboxy groups of said half ester.

2. The process as claimed in claim 1 wherein the water content of the woody material is lower than 5%.

3. The process as claimed in claim 1 wherein the feed amount of the dibasic acid anhydride to the woody material is 5 to 80% by weight.

4. The process as claimed in claim 1 wherein the esterification reaction of the hydroxy group of the woody material and the dibasic acid anhydride is performed at a temperature higher than 60° C.

5. The process as claimed in claim 1 wherein the dibasic acid anhydride added to the hydroxy group of the woody material is maleic anhydride, succinic anhydride, or phthalic anhydride.

6. The process as claimed in claim 1 wherein in the esterification reaction of the hydroxy group of the woody material and the dibasic acid anhydride, sodium carbonate is used as a catalyst.

7. The process as claimed in claim 1 wherein the molecular weight of the compound having at least two epoxy groups in the molecule thereof is 200 to 2,000.

8. The process as claimed in claim 7 wherein the compound is in a liquid state.

9. The process as claimed in claim 1 wherein the compound having at least two epoxy groups in the molecule thereof is bisphenol diglycidyl ether or glycerol diglycidyl ether.

10. The process as claimed in claim 2, wherein the compound having at least two epoxy groups in the molecule thereof is bisphenol diglycidyl ether or glycerol diglycidyl ether.

11. The process as claimed in claim 7, wherein the compound having at least two epoxy groups in the molecule thereof if bisphenol diglycidyl ether or glycerol diglycidyl ether.

12. The process as claimed in claim 8, wherein the compound having at least two epoxy groups in the molecule thereof is bisphenol diglycidyl ether or glycerol diglycidyl ether.

* * * * *